(12) United States Patent
Bending et al.

(10) Patent No.: US 11,193,408 B2
(45) Date of Patent: Dec. 7, 2021

(54) REACTIVATION CONTROL APPARATUS AND METHOD

(71) Applicant: Jaguar Land Rover Limited, Coventry (GB)

(72) Inventors: Robert Bending, Coventry (GB); Michael Davies, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 0 days.

(21) Appl. No.: 16/092,854

(22) PCT Filed: Jun. 2, 2017

(86) PCT No.: PCT/EP2017/063463
§ 371 (c)(1),
(2) Date: Oct. 11, 2018

(87) PCT Pub. No.: WO2017/201171
PCT Pub. Date: Dec. 14, 2017

(65) Prior Publication Data
US 2019/0128162 A1    May 2, 2019

(30) Foreign Application Priority Data
Jun. 7, 2016 (GB) .................... 1609923

(51) Int. Cl.
*F02D 41/02* (2006.01)
*F01N 3/08* (2006.01)
*B01D 53/94* (2006.01)

(52) U.S. Cl.
CPC ....... *F01N 3/0885* (2013.01); *B01D 53/9431* (2013.01); *B01D 53/9495* (2013.01);
(Continued)

(58) Field of Classification Search
CPC .... F01N 3/0885; F01N 3/0842; F01N 3/0814; F01N 2610/03; F01N 2900/1626;
(Continued)

(56) References Cited

U.S. PATENT DOCUMENTS 5,832,722 A * 11/1998 Cullen ............... B01D 53/8696
60/274
7,788,910 B2 * 9/2010 McCabe ............... F02D 41/029
60/295
(Continued)

FOREIGN PATENT DOCUMENTS

EP    2 746 557 A1    6/2014

OTHER PUBLICATIONS

Patents Act 1977: Combined Search and Examination Report under Sections 17 and 18(3), UKIPO Application No. 1609923.6, dated Dec. 8, 2016, 6 pp.
(Continued)

*Primary Examiner* — Matthew T Largi
(74) *Attorney, Agent, or Firm* — Reising Ethington P.C.

(57) ABSTRACT

The present disclosure relates to a control unit (8) for controlling reactivation of a lean NOx trap (LNT) disposed in an exhaust system (3) connected to an internal combustion engine (2), the control unit (8). The control unit (8) has at least one processor (11) configured to generate a reactivate flag (RF) for the LNT (6). A memory device (12) having instructions stored therein is coupled to the at least one
(Continued)

processor (11). The at least one processor (11) is configured to generate the reactivate flag (RF) when the exhaust gas supplied to the LNT (6) is lean and an LNT temperature ($T_{LNT}$) is greater than or equal to a predefined LNT temperature threshold (T1). The present disclosure also relates to a method of controlling reactivation of the LNT (6). The present disclosure also relates to a vehicle comprising reactivation control apparatus.

14 Claims, 4 Drawing Sheets

(52) U.S. Cl.
CPC ......... *F01N 3/0814* (2013.01); *F01N 3/0842* (2013.01); *F02D 41/0275* (2013.01); *F01N 2570/14* (2013.01); *F01N 2610/03* (2013.01); *F01N 2900/1402* (2013.01); *F01N 2900/1404* (2013.01); *F01N 2900/1621* (2013.01); *F01N 2900/1626* (2013.01); *Y02T 10/12* (2013.01)

(58) Field of Classification Search
CPC ..... F01N 2900/1621; F01N 2900/1404; F01N 2900/1402; F01N 2570/14; F01N 9/00; F01N 3/0871; F02D 41/0275; B01D 53/9495; B01D 53/9431
See application file for complete search history.

(56) References Cited

U.S. PATENT DOCUMENTS

| | | | |
|---|---|---|---|
| 2003/0000203 A1* | 1/2003 | Surnilla | F01N 3/0814 60/277 |
| 2003/0093988 A1* | 5/2003 | Surnilla | F01N 3/0842 60/274 |
| 2004/0182071 A1* | 9/2004 | Surnilla | F01N 3/00 60/285 |
| 2007/0084195 A1* | 4/2007 | Surnilla | F01N 3/0807 60/285 |
| 2007/0271908 A1* | 11/2007 | Hemingway | F01N 3/0814 60/286 |
| 2011/0041479 A1* | 2/2011 | Nagaoka | B01D 53/9477 60/286 |
| 2014/0170042 A1* | 6/2014 | Kim | B01D 53/9495 423/212 |
| 2015/0218988 A1* | 8/2015 | Argolini | F01N 13/009 60/605.1 |

OTHER PUBLICATIONS

International Search Report and Written Opinion of the International Searching Authority, International Application No. PCT/EP2017/063463, dated Aug. 29, 2017, 12 pp.

* cited by examiner

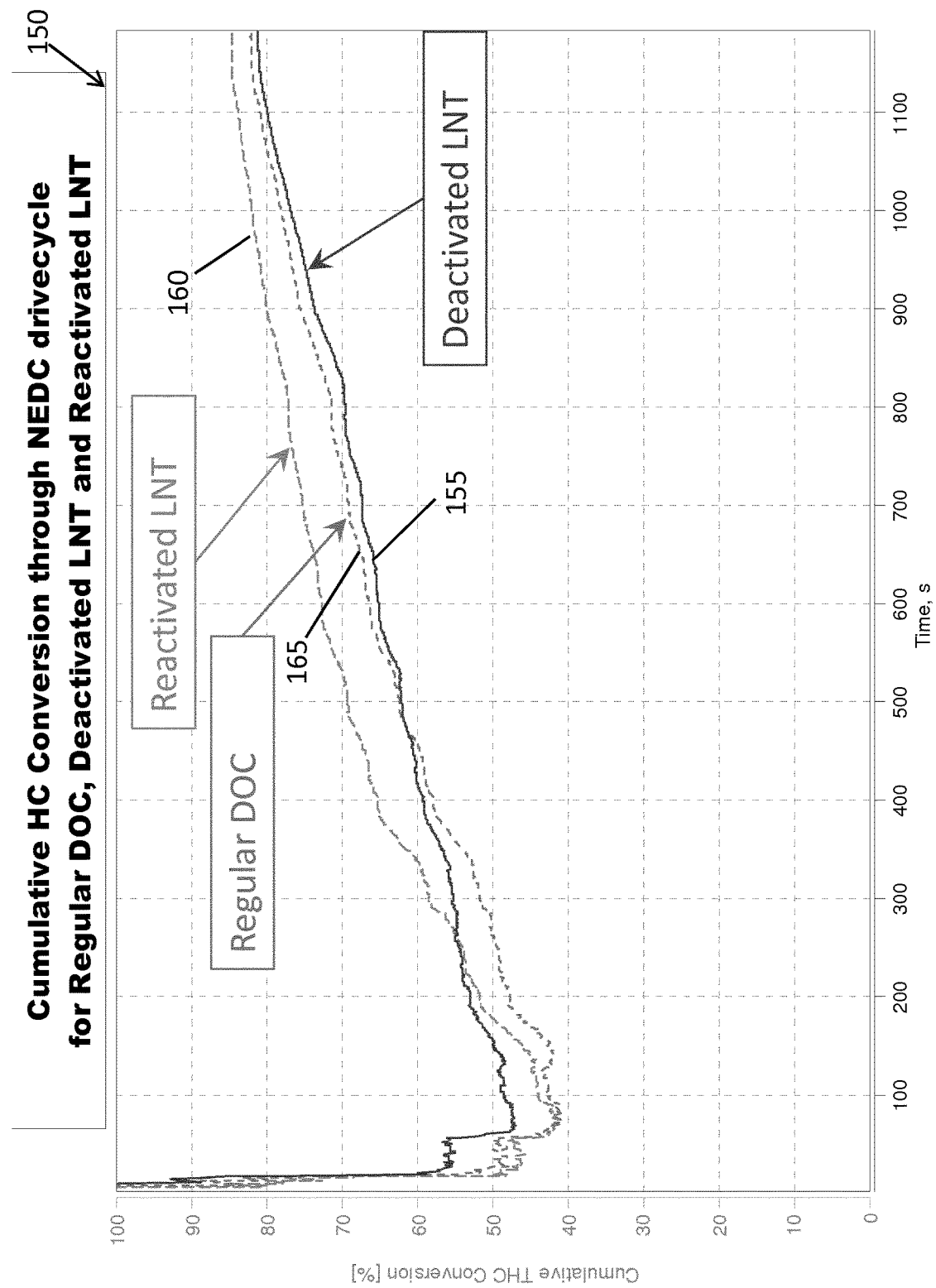

REACTIVATION CONTROL APPARATUS AND METHOD

RELATED APPLICATIONS

This application is a 35 U.S.C. § 371 national stage application of PCT Application No. PCT/EP2017/063463, filed on Jun. 2, 2017, which claims priority from Great Britain Patent Application No. 1609923.6, filed on Jun. 7, 2016, the contents of which are incorporated herein by reference in their entireties. The above-referenced PCT International Application was published in the English language as International Publication No. WO 2017/211716 A1 on Dec. 14, 2017.

TECHNICAL FIELD

The present disclosure relates to reactivation control apparatus and method. More particularly, the present disclosure relates to a control unit and method for controlling reactivation of a lean NOx trap (LNT) disposed in an exhaust system connected to an internal combustion engine. The present disclosure also relates to a vehicle comprising reactivation control apparatus.

BACKGROUND

It is known to provide a lean NOx trap (LNT) in an exhaust system of a vehicle. The LNT comprises a NOx adsorber catalyst to control lean-burn emissions. However, the NOx adsorber catalyst may become deactivated when used under high temperature lean conditions. In the context of a light duty diesel (LDD) applications, this drop in activity can be seen in carbon monoxide (CO) and hydrocarbon (HC) oxidation from ambient temperature, and in the ability to store and reduce NOx. The deactivation may, for example, occur during highway driving, where the NOx adsorber catalyst temperature may be sustained at a temperature in excess of 300° C. If a particulate filter device is fitted, the high temperature, lean operation may include reactivation of soot at temperature ranges between 550° C. and 800° C. If these conditions are kept high in oxygen content, the deactivation of the NOx adsorber catalyst may be exacerbated.

It is against this backdrop that the present invention has been conceived. At least in certain embodiments, the present invention seeks to provide a control apparatus and method which overcomes or ameliorates at least some of the limitations of prior art systems.

SUMMARY OF THE INVENTION

Aspects of the present invention relate to a method of controlling reactivation of a lean NOx trap (LNT), to a control unit for controlling reactivation of a LNT, and to a vehicle as claimed in the appended claims.

According to a further aspect of the present invention there is provided control unit for controlling reactivation of a lean NOx trap (LNT) disposed in an exhaust system connected to an internal combustion engine, the control unit comprising:

at least one processor configured to generate a reactivate flag for the LNT; and
a memory device having instructions stored therein and coupled to the at least one processor;

wherein the at least one processor is configured to generate said reactivate flag upon identification of the following conditions:
(i) the exhaust gas supplied to the LNT is lean; and
(ii) an LNT temperature is greater than or equal to a predefined LNT temperature threshold.

In dependence on the operating conditions of the internal combustion engine, the exhaust gas has either a rich composition (referred to herein as "rich exhaust gas") or a lean composition (referred to herein as "lean exhaust gas"). The exhaust gas from the internal combustion engine is supplied to the LNT disposed in the exhaust system. The LNT comprises a NOx adsorber for adsorbing NOx present in the exhaust gas. The exposure of the LNT to high temperature lean exhaust gas may deactivate the NOx adsorber. Deactivation of the LNT is caused by high-temperature, lean running. The deactivation of the LNT is characterised by poor de-NOx performance resulting in increased NOx slip. Furthermore, the conversion of hydrocarbons (HC) and carbon monoxide (CO) may be reduced. The reactivate flag is generated when the at least one processor determines that an adsorption capacity and/or an adsorption efficiency of the NOx adsorber is reduced. The reactivate flag thereby functions as an indicator that reactivation of the LNT is appropriate to increase the adsorption capacity and/or the adsorption efficiency of the NOx adsorber. At least in certain embodiments, in dependence on the reactivate flag, the reactivation of the LNT may be performed at the next available opportunity to reactivate the LNT ready for the next duty cycle. Reactivation is achieved by performing a rich de-NOx regeneration. The regeneration may continue until breakthrough of rich gasses is detected downstream of the LNT. The regeneration should occur above a temperature when clean breakthroughs are deemed to have reactivated the LNT.

The at least one processor may be configured to determine the time at which the LNT temperature is greater than or equal to the predefined temperature threshold without exposure to rich exhaust gas. The at least one processor may thereby determine the total or cumulative time that the LNT is exposed to lean exhaust gas above said predefined temperature threshold without exposure to rich exhaust gas.

The at least one processor may be configured to generate said reactivate flag in dependence on an integral of the LNT temperature with respect to time during an interval when the exhaust gas supplied to the LNT is lean and the LNT temperature is greater than or equal to the predefined LNT temperature threshold. The at least one processor may be configured to generate said reactivate flag when the integral is greater than or equal to a predefined reactivation threshold. The at least one processor may be configured to determine said integral. The at least one processor may implement an integrator configured to determine an integral representative of the time at which the LNT is held at temperature during lean conditions.

The at least one processor may generate a reactivation request signal to initiate reactivation when one or more predefined reactivation conditions are identified. The predefined reactivation conditions may determine when the internal combustion engine may operate in a rich burn mode (i.e. run rich). The predefined reactivation conditions may comprise engine speed and/or engine load. Other suitable parameters include a vehicle speed and/or a selected transmission gear. The one or more predefined reactivation condition may comprise determining that the LNT temperature is less than or equal to a first (maximum) reactivation temperature threshold; and/or determining that the LNT temperature is greater than or equal to a second (minimum) reactivation temperature threshold. Alternatively, the control unit may be coupled to an engine control unit. The engine control unit may be configured to initiate said reactivation in dependence on said reactivate flag. The engine control unit may initiate said reactivation when the one or more predefined reactivation condition is identified. It will be understood that some of the predefined reactivation conditions may be optional, calibrateable or application-specific.

The at least one processor may be configured to generate said reactivation request signal to an engine control unit to initiate operation of the internal combustion engine in a rich burn mode to reactivate the LNT. Alternatively, or in addition, the at least one processor may be configured to generate said reactivation request signal to a fuel injector disposed in the exhaust system to control injection of fuel into the exhaust gas to reactivate the LNT. Alternatively, or in addition, a fuel reformer may be used to create more reactive reductants, thereby enabling reactivation of the LNT over a broader range of engine speed and/or load conditions.

The exhaust system may comprise a particulate filter which is periodically reactivated at high temperatures, for example in the temperature range 550° C. to 800° C. If these conditions are kept high in oxygen content, the deactivation of the LNT may be exacerbated. The reactivation of the particulate filter may be taken into account when determining the period of time for which the LNT is exposed to lean exhaust gas.

The at least one processor may determine whether the exhaust gas has a rich composition and/or a lean composition. The at least one processor may thereby determine when the LNT is exposed to lean conditions which will deactivate the NOx adsorber.

The at least one processor may be configured to receive an engine operating mode signal. The at least one processor may determine the composition of the exhaust gas by monitoring when the internal combustion engine is operating in a lean burn mode. The engine operating mode signal may identify whether the internal combustion engine is operating in a lean burn mode or a rich burn mode. Alternatively, or in addition, the engine operating mode signal may comprise lambda (λ).

The at least one processor may be configured to receive a lambda (λ) signal from one or more sensor disposed in the exhaust system. The lambda (λ) signal may provide an indication of the composition of the exhaust gas, for example to provide an indication of whether rich exhaust gas or lean exhaust gas is present in the exhaust gas. A first sensor may be disposed upstream of the LNT and/or a second sensor may be disposed downstream of the LNT. The at least one processor may be configured to receive a signal from an oxygen sensor disposed in the exhaust system. The at least one processor may determine the composition of the exhaust gas by monitoring the oxygen content of the exhaust gas.

The at least one processor may be configured to determine the LNT temperature in dependence on a measured temperature of the exhaust gas supplied to the LNT.

Alternatively, or in addition, the at least one processor may be configured to model the LNT temperature. The LNT temperature may, for example, be modelled in dependence on a measured temperature of the exhaust gas supplied to the LNT and/or operating conditions of the internal combustion engine.

The control unit may be a reactivation control unit for use in conjunction with an engine control unit. Alternatively, the control unit may be incorporated into the engine control unit.

The processor may be responsive to a determination that the amount of NOx stored in the LNT exceeds a predetermined threshold to generate said reactivate flag or a further reactivate flag. Reactivation may then take place in dependent on the reactivate flag as set in response to either the detection of lean exhaust gases being present at high temperatures, and/or the determination that there has been a build up of stored NOx beyond an acceptable limit.

According to a further aspect of the present invention there is provided a vehicle comprising a control unit as described herein. The vehicle may comprise an engine control unit configured to control operation of the internal combustion engine in dependence on said reactivate flag. The engine control unit may be configured to initiate operation of the internal combustion engine in a rich burn mode to reactivate the LNT in dependence on said reactivate flag. The control unit for controlling reactivation of the LNT may be coupled to the engine control unit or may be incorporated into the engine control unit.

The internal combustion engine may be a diesel engine. More particularly, the internal combustion engine may be a light duty diesel engine. Alternatively, the internal combustion engine may be a gasoline engine or natural gas engine. Indeed, the apparatus and method described herein are applicable to any internal combustion engine capable of operating in a lean burn mode.

According to a further aspect of the present invention there is provided a method of controlling reactivation of a lean NOx trap (LNT) disposed in an exhaust system connected to an internal combustion engine, the method comprising:
  determining an LNT temperature and a composition of an exhaust gas supplied to the LNT; and
  generating a reactivate flag in dependence on identification of the following conditions:
  (i) the exhaust gas supplied to the LNT is lean; and
  (ii) the LNT temperature is greater than or equal to a predefined LNT temperature threshold.

The LNT comprises a NOx adsorber for adsorbing NOx present in the exhaust gas from the internal combustion engine. The exposure of the LNT to lean exhaust gas may deactivate the NOx adsorber. The method described herein provides an indication of the adsorption capacity of the NOx adsorber in the LNT. The reactivate flag may provide an indication that the available capacity of the LNT has been depleted and that reactivation should be performed. At least in certain embodiments the reactivation of the LNT may be performed at the next available opportunity. The LNT may thereby be maintained in a condition suitable for storage and/or reduction of NOx. By way of example, the reactivate flag may be generated following a cruise condition on a highway, and reactivation of the LNT may be performed when after the vehicle has left the highway. It will be understood that the reactivation of the LNT may be implemented in conjunction with one or more supplementary NOx reduction devices. The supplementary NOx reduction devices may comprise a selective catalytic reduction (SCR) device, for example a urea SCR; or a selective catalyst reduction filter (SCRF) device. Other reduction devices may be used.

The reactivate flag may be generated in dependence on an integral of the LNT temperature with respect to time during an interval when the exhaust gas supplied to the LNT is lean and the LNT temperature is greater than or equal to the predefined LNT temperature threshold. The reactivate flag may be generated when the integral is greater than or equal to a predefined reactivation threshold.

The reactivation of the LNT comprises passing rich exhaust gas through the LNT to allow local oxygen to be consumed. The stored NOx is thereby released and reduced. The method may comprise operating the internal combustion engine in a rich burn mode to reactivate the LNT in dependence on said reactivate flag. Alternatively, or in addition, the method may comprise injecting fuel into the exhaust system to reactivate the LNT in dependence on said reactivate flag. Alternatively, or in addition, the method may comprise operating a fuel reformer to create more reactive reductants.

The reactivation of the LNT may be initiated in dependence on said reactivate flag when suitable reactivation conditions are identified. The reactivation of the LNT may be initiated when the exhaust gas temperature is less than or equal to a first (maximum) reactivation temperature threshold and/or greater than or equal to a second (minimum) reactivation temperature threshold. The reactivation of the LNT may be initiated during a cool-down period, for example after a cruise condition.

Determining the composition of the exhaust gas supplied to the LNT may comprise monitoring when the internal combustion engine is operating in a lean burn mode. Alternatively, or in addition, the composition of the exhaust gas may be determined in dependence on a signal output by a sensor disposed in the exhaust system. The signal may, for example, be a lambda sensor or an oxygen sensor.

The method may comprise determining the LNT temperature in dependence on a measured temperature of the exhaust gas supplied to the LNT. The method may comprise modelling the LNT temperature. The LNT temperature may be modelled in dependence on a measured temperature of the exhaust gas supplied to the LNT.

At least in certain embodiments, multiple activation conditions may be defined for initiating reactivation of the LNT. The reactivate flag described herein represents an alternative activation condition.

The term "lean exhaust gas" refers to exhaust gas having a high oxygen ($O_2$) content. The lean exhaust gas may be a result of operating the internal combustion engine in a lean burn mode. When the internal combustion engine is operating in said lean burn mode, lambda ($\lambda$) is greater than one (1). The term "rich exhaust gas" is used herein to refer to exhaust gas having a low oxygen ($O_2$) content. The rich exhaust gas may be a result of operating the internal combustion engine in a rich burn mode. When the internal combustion engine is operating in said rich burn mode, lambda ($\lambda$) is less than one (1).

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 3B is a third graph showing the cumulative hydrocarbon conversion during a drive cycle.

DETAILED DESCRIPTION

Figure 1:
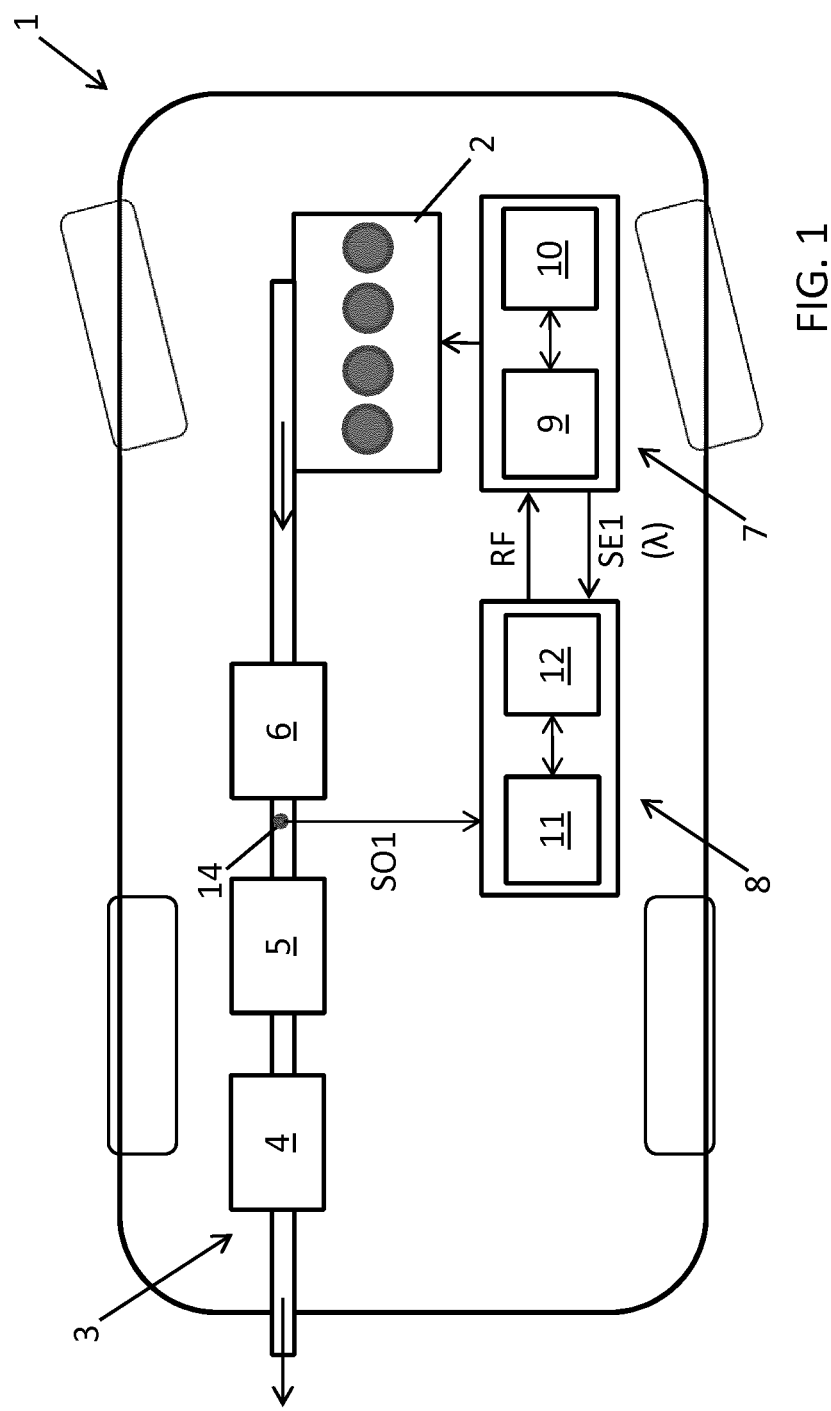
FIG. 1 shows a schematic representation of a vehicle incorporating an engine control unit and a reactivation control unit in accordance with an embodiment of the present invention.

A vehicle 1 in accordance with an embodiment of the present invention is illustrated in FIG. 1. The vehicle 1 comprises an internal combustion engine 2 having an exhaust system 3 for exhausting gases to atmosphere. The exhaust system 3 comprises a selective catalytic reduction (SCR) device 4, a diesel particulate filter (DPF) 5 and a lean NOx trap (LNT) 6. The vehicle 1 comprises an engine control unit 7 for controlling operation of the internal combustion engine 2 in dependence on driver inputs; and a reactivation control unit 8 for controlling reactivation of the LNT 6.

The internal combustion engine 2 in the present embodiment is a diesel engine. In particular, the internal combustion engine 2 is a light-duty diesel engine. Lambda ($\lambda$) of the internal combustion engine 2 is the ratio of the actual air/fuel ratio (AFR) to the stoichiometric air/fuel ratio ($AFR_{stoich}$). The internal combustion engine 2 is operable in a lean burn mode ($\lambda>1$). When operating in said lean burn mode, lambda ($\lambda$) may be 1.3, for example. The internal combustion engine 2 is also operable in a rich burn mode ($\lambda<1$).

As outlined above, the exhaust system 3 comprises a DPF 5. The DPF 5 is a particulate filter device and is periodically regenerated by raising the temperature to oxidise soot. The regeneration of the DPF 5 comprises raising the temperature of the exhaust gas, for example to between 550° C. and 800° C. for twenty (20) minutes. The DPF 5 is monitored in conventional manner to determine the need for regeneration.

Figure 2:
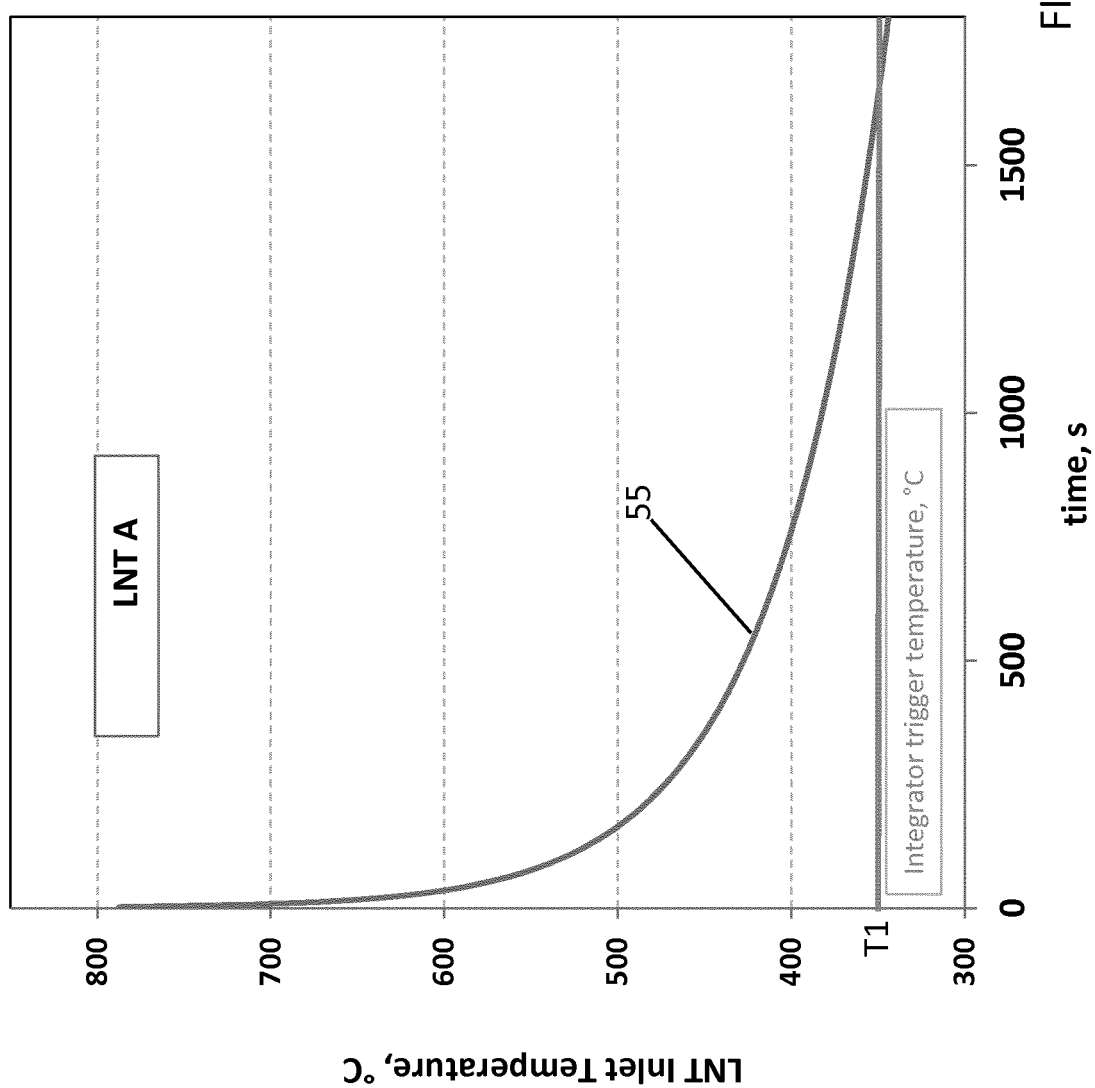
FIG. 2 is a first graph showing the relationship between time and operating temperature before the LNT is deactivated.

The LNT 6 controls the emission of lean burn gases from the exhaust system 3. More particularly, the LNT 6 is configured to control emission of NOx gases, typically comprising Nitric Oxide (NO), from the internal combustion engine 2. The LNT 6 has particular application at relatively low temperatures, for example in the range 20° C. to 200° C., which may occur after a cold-start of the internal combustion engine 2. The LNT 6 includes a NOx adsorber which is effective to bind the NOx gases during lean exhaust conditions. The NOx adsorber may be applied as a catalyst washcoat and may, for example, comprise palladium (Pd) and platinum (Pt); or cerium (Ce) and barium (Ba). It will be appreciated that other chemical compositions of the NOx adsorber are useful. The NOx adsorber may become deactivated when exposed to high-temperature, lean exhaust gas. This drop in activity can compromise oxidation of carbon monoxide (CO) and hydrocarbon (HC) from ambient temperatures; and a reduction in the ability of the NOx adsorber to store and reduce NOx in the exhaust gas. A first graph 50 illustrating the relationship between an LNT temperature $T_{LNT}$ and a deactivation time (seconds) is shown in FIG. 2. The LNT temperature $T_{LNT}$ indicated in FIG. 2 corresponds to an inlet temperature of the LNT 6. A first plot 55 represents the LNT temperature $T_{LNT}$ that can be sustained for a given time period before reactivation of the LNT 6 is required. The LNT 6 is deactivated when the LNT temperature $T_{LNT}$ is greater than a predefined LNT temperature threshold T1 which is indicated in FIG. 2. The LNT temperature threshold T1 in the present embodiment is defined as 350° C. It will be understood that the LNT temperature threshold T1 can be calibrated and may be defined as a value which is higher or lower than 350° C.

When deactivated, the available storage capacity or the storage efficiency of the LNT 6, and CO and HC activity, is reduced. In order to increase the storage capacity or the storage efficiency of the LNT 6, and to regain desired levels of CO and HC activity, the NOx adsorber is periodically reactivated to release and reduce stored NOx. Reactivation comprises passing rich exhaust gas over the NOx adsorber to allow local oxygen to be consumed, to release the stored NOx and to reduce the released NOx, for example to nitrogen ($N_2$). The rich exhaust gas can be sustained over the NOx adsorber for a period of time until rich exhaust gas is detected downstream of the NOx adsorber indicating that reactivation of the LNT 6 is complete (i.e. rich breakthrough detected). A lower operating temperature of approximately 250° C. may apply when detecting rich breakthrough. Alternatively, an open loop control strategy may be implemented, for example comprising determining the available capacity of the LNT 6 (for example by modelling NOx storage) and scheduling the supply of rich exhaust gas in dependence on the determined available capacity. Following reactivation, the NOx adsorber is available to store NOx during the following duty cycle, for example during the next cold-start cycle.

The lean exhaust gas typically occurs when the internal combustion engine 2 is operating in said lean burn mode. The rich exhaust gas typically occurs when the internal combustion engine 2 is operating in said rich burn mode. In certain embodiments, the exhaust system 3 may comprise control devices for controlling the temperature and/or composition of the exhaust gas. For example, the exhaust system 3 may comprise a fuel injector for injecting fuel upstream of the LNT 6 selectively to provide rich exhaust gas suitable for regenerating the LNT 6. Alternatively, a fuel reformer may be used to create more reactive reductants. At least in certain embodiments, the composition of the exhaust gas may be adjusted within the exhaust system 3 at least partially independently of the operation of the internal combustion engine 2. For example, the composition of the exhaust gas may be controlled at least partially independently of the operating speed and/or load of the internal combustion engine 2.

The engine control unit 7 comprises at least a first processor 9 connected to a first memory device 10. The first processor 9 is configured to implement a set of non-transitory computational instructions stored on said first memory device 10. When executed, the computational instructions cause the first processor 9 to implement an engine control strategy for controlling operation of the internal combustion engine 2. The reactivation control unit 8 comprises at least a second processor 11 connected to a second memory device 12. The second processor 11 is configured to implement a set of non-transitory computational instructions stored on said second memory device 12. When executed, the computational instructions cause the second processor 11 to implement a reactivation control strategy for controlling reactivation of the LNT 6. The second processor 11 models an LNT temperature $T_{LNT}$ in dependence on the operating conditions of the internal combustion engine 2. The LNT temperature $T_{LNT}$ may, for example, be indicative of an inlet temperature of the LNT 6, or a bed temperature of the LNT 6. The second processor 11 receives an engine operating mode signal SE1 from the engine control unit 7 to indicate whether the internal combustion engine 2 is operating in a lean burn mode or a rich burn mode. The engine operating mode signal SE1 could comprise lambda (λ). Furthermore, the second processor 11 receives an oxygen signal SO1 from an oxygen sensor 14 disposed downstream of the LNT 6 to determine the air/fuel composition of the exhaust gas exiting the LNT 6 (i.e. to determine whether the exhaust gas is rich or lean). Rather than model the LNT temperature $T_{LNT}$, a temperature sensor (not shown) may be provided for measuring the temperature of the LNT 6. The temperature sensor may be disposed at an inlet of the LNT 6 or in the bed of the LNT 6.

The reactivation control unit 8 is configured to identify operating conditions which are likely to result in deactivation of the NOx adsorber. In particular, the reactivation control unit 8 is configured to monitor exposure of the NOx adsorber to lean exhaust gas above the LNT temperature threshold T1. The reactivation control unit 8 models the LNT temperature $T_{LNT}$ and the composition of the exhaust gas. In the present embodiment, the reactivation control unit 8 is configured to determine when the exhaust gas has a net lean composition in dependence on the engine operating mode signal SE1 received from the engine control unit 7. Alternatively, or in addition, the reactivation control unit 8 may be configured to receive the oxygen signal SO1 from the oxygen sensor 14 to determine when the LNT 6 is exposed to lean exhaust gas. In alternate embodiments, a second oxygen sensor (not shown) may be provided between the internal combustion engine 2 and the LNT 6 to monitor the air/fuel composition of the exhaust gas to determine whether the exhaust gas introduced into the LNT 6 is rich or lean. The reactivation control unit 8 determines the time at which the LNT 6 is exposed to lean exhaust gas without exposure to rich exhaust gas while the LNT temperature $T_{LNT}$ is above the LNT temperature threshold T1. The reactivation control unit 8 determines an integral of the LNT temperature $T_{LNT}$ with respect to time during an interval when the exhaust gas supplied to the LNT is lean and the LNT temperature $T_{LNT}$ is greater than or equal to the LNT temperature threshold T1. The reactivate flag (RF) is generated when the integral is determined greater than or equal to a predefined reactivation threshold. By integrating the temperature with respect to time, the reactivation control unit 8 makes allowances for the magnitude of the temperature as well as the time period during which the LNT 6 is exposed to lean exhaust gas. It will be appreciated that the time threshold and/or the temperature threshold may be calibrated for particular applications.

The reactivate flag RF provides an entry condition for reactivation of the LNT 6. The engine control unit 7 initiates reactivation of the LNT 6 in dependence on the reactivate flag RF when suitable conditions are identified. In dependence on said reactivate flag RF, the engine control unit 7 identifies the next available opportunity to reactivate the LNT 6. The engine control unit 7 may, for example, determine that reactivation of the LNT 6 may be performed when the LNT temperature $T_{LNT}$ is below a first (maximum) reactivation temperature threshold and above a second (minimum) reactivation temperature threshold. The first and second reactivation temperature thresholds may define a temperature range in which reactivation of the NOx adsorber may be performed. Upon identification of an opportunity to perform reactivation, the engine control unit 7 controls the internal combustion engine 2 to initiate a rich burn mode. The rich burn mode results in the generation of rich exhaust gas which is introduced into the LNT 6 to reactivate the NOx adsorber, as described herein. The internal combustion engine 2 may continue to operate in said rich burn mode until the oxygen sensor 14 detects rich gases downstream of the LNT 6, indicating that reactivation of the LNT 6 is complete. As outlined above, open loop control strategies may be implemented by modelling the available capacity of the LNT 6. The engine control unit 7 may then control the internal combustion engine to revert to a lean burn mode.

The operation of the engine control unit 7 and the reactivation control unit 8 in accordance with an embodiment of the present invention will now be described. A vehicle operating cycle which may result in the deactivation of the LNT 6 is highway driving which may comprise driving the vehicle 1 at a relatively constant speed, for example 70 mph, over an extended period of time. An LNT temperature $T_{LNT}$ in excess of 300° C. may be sustained during this type of operation. Furthermore, during highway driving, the internal combustion engine 2 typically operates in said lean burn mode and the LNT 6 is exposed to lean exhaust gas without exposure to rich exhaust gas. Thus, highway driving of the vehicle 1 may result in deactivation of the LNT 6 which would reduce its ability to adsorb NOx. When the available capacity of the LNT 6 is reduced, the control of NOx emissions may be performed by the SCT 5 downstream of the LNT 6. The reactivation control unit 8 determines the integral of the LNT temperature $T_{LNT}$ with respect to time during an interval when the exhaust gas supplied to the LNT is lean and the LNT temperature $T_{LNT}$ is greater than or equal to the LNT temperature threshold T1. The reactivation control unit 8 generates the reactivate flag (RF) when the integral is determined greater than or equal to a predefined reactivation threshold. In dependence on the reactivate flag RF, the engine control unit 7 controls the internal combustion engine 2 to initiate a rich burn mode when the LNT temperature $T_{LNT}$ drops to a temperature suitable for reactivation, for example in the range 200° C. to 300° C. When the oxygen sensor 14 detects rich exhaust gas downstream of the LNT 6, the engine control unit 7 controls the internal combustion engine 2 to revert to the lean burn mode.

Figure 3A:
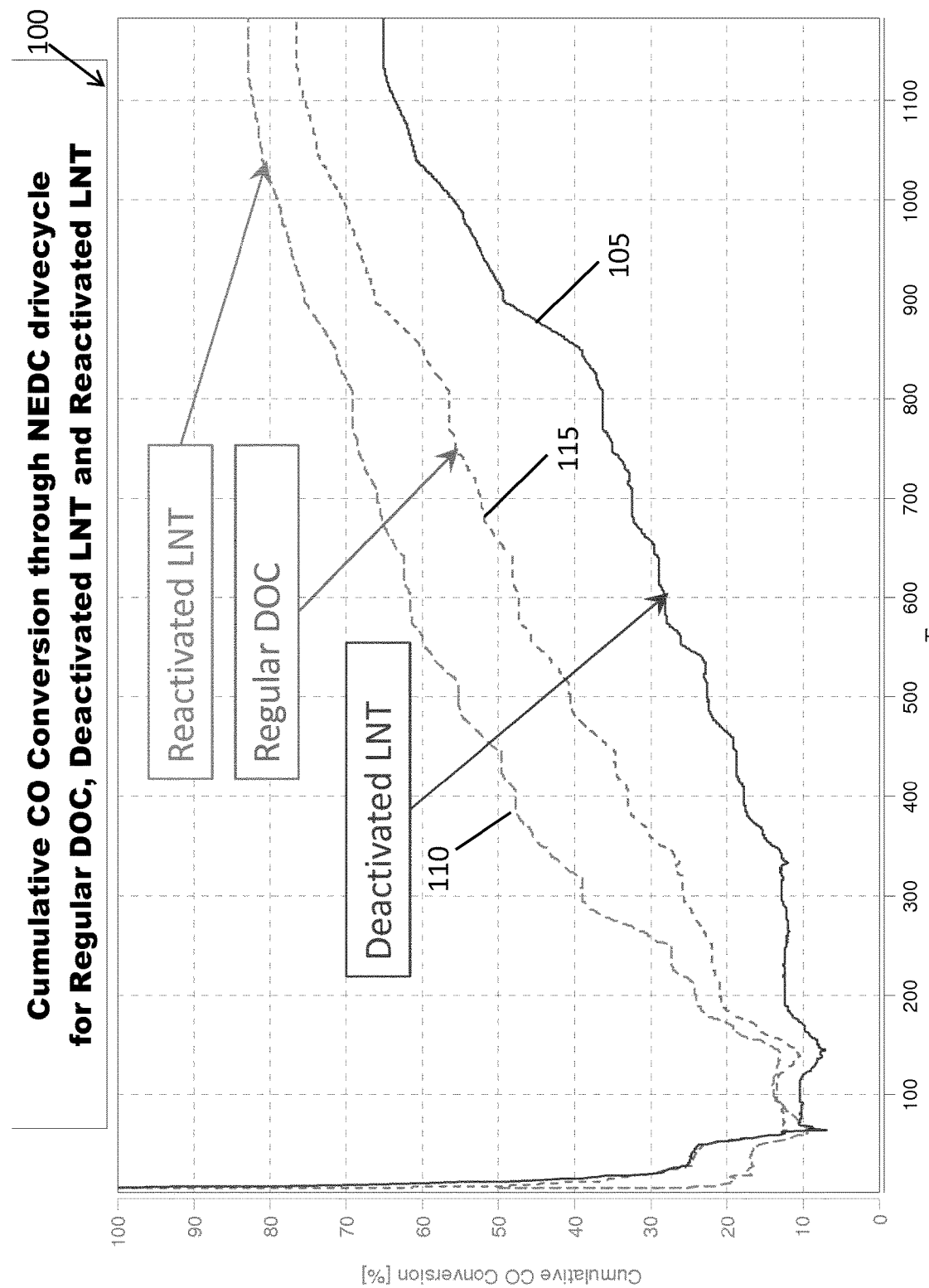
FIG. 3A is a second graph showing the cumulative carbon monoxide conversion during a drive cycle.

The efficacy of the LNT 6 for different operating scenarios will now be described with reference to second and third graphs 100, 150 shown in FIGS. 3A and 3B respectively.

The second graph 100 shows the cumulative carbon monoxide (CO) conversion (%) during a new European drive cycle (NEDC). A first plot 105 represents the CO conversion (%) of a deactivated LNT 6; and a second plot 110 represents the CO conversion (%) of the LNT 6 following reactivation. By way of comparison, a third plot 115 represents the CO conversion (%) of a regular diesel oxidation catalyst (DOC).

The third graph 150 shows the cumulative total hydrocarbon (THC) conversion (%) during a new European drive cycle (NEDC). A first plot 155 represents the THC conversion (%) of a deactivated LNT 6; and a second plot 160 represents the THC conversion (%) of the LNT 6 following reactivation. By way of comparison, a third plot 165 represents the THC conversion (%) of a regular diesel oxidation catalyst (DOC).

As described herein, the reactivation control unit 8 determines when the NOx adsorber is deactivated and generates the reactivate flag RF. It will be understood that references herein to the NOx adsorber being deactivated may refer to a decrease in the adsorption capacity or the adsorption efficiency of the NOx adsorber. It is not necessary that the NOx adsorber is completely deactivated; rather, the deactivation of the NOx adsorber may be partial. For example, the reactivation control unit 8 may determine that the NOx adsorber is deactivated if the NOx adsorption efficiency of the LNT 6 decreases below a predefined threshold. Conversely, the reactivation control unit 8 may determine that reactivation is complete or that the NOx adsorber is reactivated, when the adsorption efficiency or the adsorption capacity of the NOx adsorber increases above a predefined threshold. The performance of the LNT 6 may be modelled, for example in dependence on operating conditions of the internal combustion engine 2. Alternatively, or in addition, the effectiveness of the NOx adsorber may be determined in dependence on signals received from one or more sensor disposed in the exhaust system 3. The one or more sensor may comprise an oxygen sensor and/or a NOx sensor.

In the embodiments described above, reactivation is carried out at least partly in response to the detection that the exhaust gas supplied to the LNT is lean while an LNT temperature is greater than or equal to a predefined temperature threshold. This reactivation may be supplemental to a periodic reactivation carried out in response to a natural build-up over time of NOx within the LNT (it will be appreciated that, since the LNT has the function of storing NOx, and has a maximum NOx storage capacity, the available NOx storage capacity will be reduced over time, requiring reactivation to purge NOx from the LNT to recover storage capacity for subsequent operation of the LNT). The amount of NOx stored in the LNT and/or the amount of NOx storage capacity remaining in the LNT can be estimated using established NOx storage models with inputs comprising temperature, sulphur exposure, high temperature exposure (permanent deactivation of NOx storage sites), input NOx flux and LNT storage efficiency.

In one example implementation, a reactivation process (such as that described above) may be triggered by a flag which is set in response to two different triggers, one of these being the detection of the lean exhaust gas and high temperature conditions described earlier, and the other being a determination that the amount of NOx built up in the LNT has reached a predetermined threshold (or put another way, that the amount of NOx storage capacity remaining has fallen below a predetermined threshold). The predetermined threshold may be set in terms of a mass of NOx, or in terms of a proportion of the NOx storage capacity of the LNT. If the flag is set in response to either of these events, reactivation will subsequently occur, at a suitable time, based on the flag, in the manner described above.

It will be appreciated that various changes and modifications may be made to the apparatus and method described herein without departing from the scope of the present invention.

The invention claimed is:

1. A control system for controlling reactivation of a lean NOx trap (LNT) disposed in an exhaust system connected to an internal combustion engine, the control system comprising:
   at least one processor configured to generate a reactivate flag for the LNT; and
   a memory device having instructions stored therein and coupled to the at least one processor;
   wherein the at least one processor is configured to generate said reactivate flag (RF) upon identification of the following conditions:
      an exhaust gas supplied to the LNT is lean; and
      an LNT temperature is greater than or equal to a predefined temperature threshold, and in dependence on an integral of the LNT temperature with respect to time during an interval when the exhaust gas supplied to the LNT is lean and the LNT temperature is greater than or equal to the predefined temperature threshold,
   and further wherein, in dependence on said reactivate flag, the at least one processor is further configured to generate a reactivation request signal when at least one predefined reactivation condition is identified, said at least one predefined reactivation condition comprising determining that the LNT temperature has subsequently fallen to a value equal to or less than a first reactivation temperature threshold, said first reactivation temperature threshold being less than the predefined temperature threshold.

2. The control system as claimed in claim 1, wherein the at least one processor is configured to generate said reactivate flag when the integral is greater than or equal to a predefined reactivation threshold.

3. The control system claimed in claim 1, wherein the at least one processor is configured to generate said reactivation request signal to an engine control unit to initiate operation of the internal combustion engine in a rich burn mode to reactivate the LNT.

4. The control system as claimed in claim 1, wherein the at least one processor is further configured to receive an engine operating mode signal, and to determine a composition of the exhaust gas by determining when the internal combustion engine is operating in a lean burn mode.

5. The control system as claimed in claim 1, wherein the at least one processor is further configured to receive a signal from an oxygen sensor disposed in the exhaust system, and to determine a composition of the exhaust gas by monitoring an oxygen content of the exhaust gas.

6. The control system as claimed in claim 1, wherein the at least one processor is further configured to determine the LNT temperature in dependence on a measured temperature of the exhaust gas supplied to the LNT.

7. The control system as claimed in claim 1, wherein the at least one processor is configured to model the LNT temperature.

8. The control system as claimed in claim 1, wherein the processor is responsive to a determination that an amount of NOx stored in the LNT exceeds a predetermined threshold to generate said reactivate flag or a further reactivate flag.

9. A vehicle comprising the control system as claimed in claim 1.

10. The vehicle as claimed in claim 9, further comprising an engine control unit configured to control operation of the internal combustion engine in dependence on said reactivate flag.

11. A method of controlling reactivation of a lean NOx trap (LNT) disposed in an exhaust system connected to an internal combustion engine, the method comprising:
    determining an LNT temperature and a composition of an exhaust gas supplied to the LNT; and
    generating a reactivate flag in dependence on identification of the following conditions:
       the exhaust gas supplied to the LNT is lean; and
       the LNT temperature is greater than or equal to a predefined LNT temperature threshold,
    and in dependence on an integral of the LNT temperature with respect to time during an interval when the exhaust gas supplied to the LNT is lean and the LNT temperature is greater than or equal to the predefined LNT temperature threshold,
       wherein, in dependence on said reactivate flag, the method further comprises generating a reactivation request signal when at least one predefined reactivation condition is identified, said at least one predefined reactivation condition comprising determining that the LNT temperature has subsequently fallen to a value equal to or less than a first reactivation temperature threshold, said first reactivation temperature threshold being less than the predefined temperature threshold.

12. The method as claimed in claim 11, wherein the reactivate flag is generated when the integral is greater than or equal to a predefined reactivation threshold.

13. The method as claimed in claim 11, further comprising operating the internal combustion engine in a rich burn mode to reactivate the LNT in dependence on said reactivate flag.

14. The method as claimed in claim 11, wherein determining the composition of the exhaust gas comprises identifying when the internal combustion engine is operating in a lean burn mode.

* * * * *